(12) United States Patent
Taketsu et al.

(10) Patent No.: US 6,905,041 B1
(45) Date of Patent: Jun. 14, 2005

(54) FUEL TANK MADE FROM ALUMINUM COATED STEEL SHEET

(75) Inventors: Hirofumi Taketsu, Sakai (JP); Masaya Yamamoto, Sakai (JP); Keiji Izumi, Sakai (JP); Shuntaro Sudo, Toyota (JP)

(73) Assignee: Nisshin Steel Co., Ltd., Tokyo (JP)

( * ) Notice: Subject to any disclaimer, the term of this patent is extended or adjusted under 35 U.S.C. 154(b) by 0 days.

(21) Appl. No.: 09/787,998

(22) PCT Filed: Oct. 18, 1999

(86) PCT No.: PCT/JP99/05727

§ 371 (c)(1),
(2), (4) Date: Mar. 23, 2001

(87) PCT Pub. No.: WO00/23336

PCT Pub. Date: Apr. 27, 2000

(30) Foreign Application Priority Data

Oct. 19, 1998 (JP) .......................... 10-296570
Jul. 6, 1999 (JP) .......................... 11-191477

(51) Int. Cl.⁷ .............................. B23P 17/00
(52) U.S. Cl. .................... 220/562; 427/156; 29/424
(58) Field of Search ................. 29/424; 220/562; 427/156

(56) References Cited

U.S. PATENT DOCUMENTS

| | | | |
|---|---|---|---|
| 3,832,962 A | * | 9/1974 | Rolles |
| 3,965,024 A | * | 6/1976 | Schmadel et al. .......... 510/318 |
| 4,289,804 A | * | 9/1981 | Labate |
| 4,443,590 A | * | 4/1984 | Kamatani et al. |

(Continued)

FOREIGN PATENT DOCUMENTS

| JP | 57041396 | 3/1982 | ............ C25D/5/12 |
|---|---|---|---|
| JP | 60-123347 | 7/1985 | |
| JP | 62120494 | 6/1987 | ........... C25D/11/38 |
| JP | 06306637 | 11/1994 | ........... C23C/28/00 |
| JP | 09053166 | 2/1997 | ............ C23C/2/12 |
| JP | 09142466 | 6/1997 | ............ B65D/8/00 |
| JP | 09-254312 | 9/1997 | |
| JP | 10272582 | 10/1997 | .......... B23K/11/16 |
| JP | 410265967 | * 6/1998 | |
| JP | 10193507 | 7/1998 | ........... B32B/15/08 |

OTHER PUBLICATIONS

PMF flowformingplus www.pmfind.com/process/press-forming.ase.*
Press Forming http://Peterson–mfg.com/Press.html.*
Merriam Webster's Collegiate Dictionary, 10th Ed., p 458, 1997.*
Abstract of Japanese Patent No. JP53–19981A, "Steel Sheet Coated with Chromate Films Differentiated in Thickness", 5 pp.

Primary Examiner—Kenneth Vanderpuye
Assistant Examiner—Steve Blount
(74) Attorney, Agent, or Firm—Webb Ziesenheim Logsdon Orkin & Hanson P.C.

(57) ABSTRACT

An Al-coated steel sheet is improved in anti-scratching property during press-working and corrosion-resistance to a stored fuel by direct formation of an alkali-soluble resin film on an Al-coated steel sheet. An alkali-soluble resin, which can be dissolved in an alkali liquid of pH 9.0 or higher, is preferably urethane or acrylic resin with an acid value of 40–90 having a carboxyl group in its molecule. Alkali metal may be substituted for 1–50% hydrogen atom of the carboxyl group. A powdery synthetic resin at a ratio of 1–25 mass % and/or powdery silica at a ratio of 1–30 mass % may be dispersed in the resin film. The resin film is preferably of 0.2–5.0 μm in thickness. After the Al-coated steel sheet is painted with the resin, it is shaped to upper and lower halves of a fuel tank and washed with an alkali to dissolve off the resin film. The upper and lower halves are welded together and coated with a paint at their external surfaces to fabricate a fuel tank.

6 Claims, 1 Drawing Sheet

U.S. PATENT DOCUMENTS

| | | | |
|---|---|---|---|
| 4,748,194 A | * | 5/1988 | Geeck |
| 4,954,372 A | * | 9/1990 | Sako et al. |
| 5,234,974 A | * | 8/1993 | Calhoun et al. |
| 5,308,709 A | * | 5/1994 | Ogino et al. |
| 5,393,605 A | * | 2/1995 | Miyoshi et al. |
| 5,578,669 A | * | 11/1996 | Odawa et al. |
| 5,614,263 A | * | 3/1997 | Ogawa et al. ............... 427/341 |
| 6,009,913 A | * | 1/2000 | Kojima et al. |
| 6,060,554 A | * | 5/2000 | Mitsuji et al. |
| 6,730,407 B2 | * | 5/2004 | Mori et al. ............... 428/425.8 |

* cited by examiner

FUEL TANK MADE FROM ALUMINUM COATED STEEL SHEET

BACKGROUND OF THE INVENTION

1. Field of the Invention

The present invention is accomplished for elimination of the above-mentioned problems. The object of the present invention is to offer an Al-coated steel sheet, and preferably a fuel tank made from an Al-coated steel sheet, which satisfies requisitions for use as a fuel tank superior of corrosion resistance and durability.

2. Prior Art

A fuel tank 1 for an automobile or the like has been conventionally manufactured by the following manner: An upper half 2 and a lower half 3 are independently prepared from steel sheets by press-working, and then washed with an alkali liquid. Halves 2 and 3 are assembled to a tank shape, joined together by resistance-welding such as seam-welding and spot-welding, and then coated with an anti-corrosion paint at their whole external surfaces, as shown in FIG. 2.

The upper half 2 and the lower half 3 have sinks 4 of the same openings and shapes. Flanges 5 are formed at the whole periphery of the sinks 4. These halves 2 and 3 are joined to a unitary body by putting the flange 5 of the upper half 2 on the flange 5 of the lower half and welding together. Since a material is worked to the fuel tank with heavy duty, it shall be good of press-workability, resistance-weldability and post-coat corrosion-resistance. In the state that such the fuel tank is installed in an automobile, its inner surface is exposed to a corrosive atmosphere containing a fuel. If the inner surface is corroded by the fuel, a filter of a fuel circulation system is choked up by resulting corrosion products. The corrosion sometimes causes generation of through holes. In this sense, the material shall be good of corrosion-resistance.

A steel sheet hot-dip coated with a Pb-Sn alloy (as disclosed in JP57-6133B) and a Zn-coated steel sheet (JP53-19981B) have been used so far, in order to satisfy such requisitions for a material of a fuel tank.

Although the steel sheet hot-dip coated with a Pb-Sn alloy exhibits excellent corrosion-resistance against a fuel solely composed of gasoline, it is likely corroded by alcohol in the case where a fuel tank receives an alcoholic fuel such as methanol or ethanol or a fuel mixture of alcohol with gasoline. When a fuel tank made from the Zn-coated steel sheet is used for receiving degraded gasoline as a fuel or left in a humid environment at a high temperature over a long term, it is attacked by corrosive substances such as formic acid and acetic acid generated by oxidation and degradation of the gasoline, resulting in generation of white rusts.

A steel sheet coated with Al or an Al-Si alloy (as disclosed in JP4-68399B) or an Al-coated steel sheet to which an organic resin film dispersing metal powder therein is applied (hereinafter referred to as "an anti-corrosion painted steel sheet", as disclosed in JP6-306637A; JP9-53166A) is proposed as a material for a fuel tank in order to eliminate the above-mentioned problems. Corrosion-resistance of the Al-coated steel sheet against an organic acid is enhanced by protective function of an oxide film formed on a surface of the Al plating layer. The anti-corrosion painted steel sheet exhibits good corrosion-resistance against gasoline due to the organic resin film, and metal powder dispersed in the organic film bestows the organic film with electric conductivity so as to facilitate resistance-welding the upper half 2 with the lower half 3.

However, an Al plating layer formed on the steel sheet is inferior of anti-scratching property during press-working, so that substrate steel is often partially exposed to the outside when it is press-worked to upper and lower halves 2, 3. The exposed part will be an origin of internal corrosion, when it is subjected to degraded gasoline including organic acids. A paint film applied to the external surface of the fuel tank does not fulfill its corrosion-preventing function during progress of under-coat corrosion in some cases. On the other hand, the anti-corrosion painted steel sheet is often materially ruptured due to poor lubricity, when it is press-worked to members of a fuel tank.

The plastic reformation of the anti-corrosion painted steel sheet during press-working is improved by applying a lubricate film of an organic resin good of lubricity, anti-corrosion and plasticity to a surface of the anti-corrosion painted steel sheet (as disclosed JP6-306637A, JP9-53166A). However, when the anti-corrosion painted steel sheet after application of the lubricate film is worked to a shape of the fuel tank, the organic resin film as well as the lubricate film are thermally decomposed during resistance-welding. Offensive odor and smoke are abundantly generated by the decomposition, so as to deteriorate the working environment.

Application of an alkali-soluble lubricate film is also proposed, in order to facilitate removal of the lubricate film before welding the upper half 2 to the lower half 3. Although the alkali-soluble lubricate film can be washed off by an alkali, an organic resin film remains on a surface of the steel sheet and causes generation of offensive odor and smoke. Consequently, it is necessary to completely remove the organic resin film from the flanges 5 of the upper and lower halves 2, 3 before welding. Although the organic resin film is peeled off by a chemical method such as application of a proper peeling agent or a mechanical method such as polishing, anyway also needs time and labor.

Lubricity of a resin film may be improved by dispersion of a powdery synthetic resin such as polyolefin or fluororesin to an organic resin film instead of a lubricate film. However, such additive deteriorates adhesiveness and durability of an anti-corrosion paint film applied to the external surface of the fuel tank and causes exfoliation of the paint film during use.

SUMMARY OF THE INVENTION

The present invention eliminates the above-mentioned problems. The object of the present invention is to offer an Al-coated steel sheet, and preferably a fuel tank made from an Al-coated steel sheet, which satisfies the requirements for use as a fuel tank having superior corrosion resistance and durability.

According to the present invention, an alkali-soluble resin film is directly applied to a surface of an Al-coated steel sheet. The Al-coated steel sheet, to which the alkali-soluble resin film is applied, is formed to upper and lower halves of a fuel tank by press-working. The upper and lower halves are washed with an alkali liquid to dissolve off the resin film and joined together to a unitary body. Thereafter, a paint is applied to an external surface of the unitary body. A fuel tank excellent in corrosion-resistance and durability is manufactured in this way.

An alkali-soluble resin applied to a surface of an Al-coated steel sheet is preferably one, which can be dissolved in an alkali liquid of pH 9.0 or higher, has a carboxyl group in its molecule with an acid value of 40–90. A resin having hydrogen atoms of the carboxyl group substituted by an alkali metal at a ratio of 1–50% is especially recommended, since it is dissolved off in 1 minute by an alkali liquid of pH 9.0. A urethane or acrylic resin excellent in adhesiveness and plasticity is used as such a resin, to inhibit peeling of a resin film during press-working. Lubricity of the resin film can be also improved by dispersion of 1–25 mass % a powdery synthetic resin and/or 1–30 mass % powdery silica. The resin film is preferably of 0.2–5.0 $\mu$m in thickness.

DESCRIPTION OF THE PREFERRED EMBODIMENTS

A resin film, which is excellent in lubricity, corrosion resistance and plasticity and which also maintains excellent corrosion resistance as well as adhesiveness to an anti-corrosion film even after press-working a steel sheet to a shape of a fuel tank, has been used so far as a resin film formed on an Al-coated steel sheet for use as a fuel tank. On the contrary, the inventors researched to develop a resin film which serves as a protective film until press-working and is then easily removed from the steel substrate. When such resin film is realized, the resin film is completely removed from the steel sheet before seam-welding. Consequently, upper and lower halves are joined together in the absence of the resin film during seam-welding, so as to avoid generating offensive odor or smoke as decomposition products of the resin film. Even when a powdery synthetic resin which puts harmful effects on adhesiveness to an anti-corrosion film is added to the resin film serving as a protective film, durability of the fuel tank does not worsen, since the powdery synthetic resin is removed together with the resin film. However, it is very difficult to peel off a conventional resin film after the press-working, since it firmly sticks to an Al-coated steel sheet due to drawing motion during the press-working.

The inventors investigated a conventional manufacturing process wherein halves of a fuel tank for an automobile are washed with an alkali liquid after a press-working step but before a welding step, and hit upon the idea that formation of an alkali-soluble resin film directly on a surface of an Al-coated steel sheet is profitable for removal of such a resin film by washing the halves with an alkali liquid without necessity of peeling off the resin after the press-working.

Figure 1:
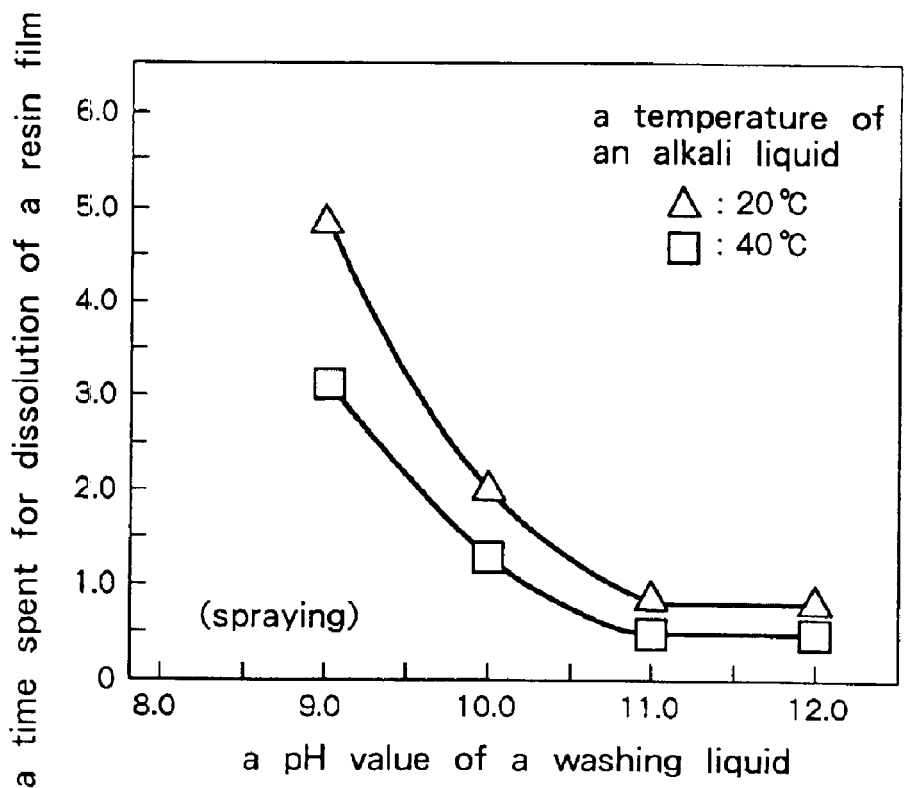
FIG. 1 is a graph showing effects of a pH value and a temperature of an alkali liquid on dissolution of a resin film. The resin film was of 1.0 $\mu$m in thickness and formed on a surface of a steel sheet hot-dip coated with an Al-9% Si alloy at a ratio of 30 g/m$^2$ per single surface by applying an emulsion of a urethane resin having a carboxyl group in its molecule with an acid value of 70 with a bar-type applicator and then baked in an oven.
Figure 2:
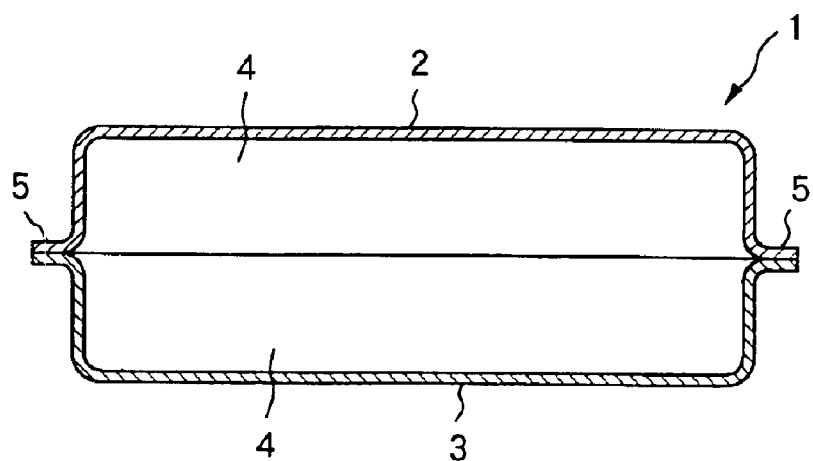
FIG. 2 is a sectional view illustrating a fuel tank.

Solubility of a resin film varies greatly depending upon the pH value of the alkali liquid used for washing, as shown in FIG. 1. A time for dissolution of the resin film is changed in correspondence with the pH value. It is necessary to adjust the solubility of the resin film so that dissolution is finished within 5 minutes in an alkali liquid of pH 9.0 or higher, taking into account a washing time predetermined within 5 minutes in an alkali cleaning step of a conventional process for manufacturing members of a fuel tank. Dissolution of a resin film in an alkali liquid is promoted by introduction of a free carboxyl group(s) in a molecule of the resin so as to weaken water resistance. The resin, in which a free carboxyl group(s) is introduced, has solubility varied with an acid value. The acid value is represented by a mg number of potassium hydroxide necessary for neutralization of acid contents (acid groups) in 1 g a resin. If the acid value is less than 40, it takes 5 minutes or longer to completely dissolve the resin film in an alkali liquid of pH 9.0 or higher. However, acid value greater than 90 causes poor film-forming ability of the resin and deteriorates the anti-scratching property of the resin film. As a consequence, the carboxyl group(s) is preferably introduced to the resin in a manner such that the acid value is adjusted in a range of 40–90.

More recently, a cleaning solution is prepared at an increasingly lower pH value to keep the alkali cleaning work safe, and a cleaning time is shortened to improve productivity. In short, there has been set the work goal that the cleaning is completed within 1 minute using an alkali liquid of pH 9.0 or so. According to the work goal, the resin film shall be also dissolved within 1 minute by the alkali liquid of pH 9.0. However, 3–5 minutes are ordinarily required for dissolution of a resin film, in which a free carboxyl group(s) is merely introduced so as to adjust an acid value to 40–90, in an alkali liquid of pH 9.0. Due to such a longer time for dissolution, a cleaning liquid of a higher pH value is inevitably used for shortening the cleaning time without change of a resin kind. In actuality, a cleaning liquid of pH 10 has been used for completion of the cleaning within 1.5–2.0 minutes, or a cleaning liquid of pH 11 or higher has been used for completion of the cleaning within 1 minute.

The inventors have searched for a method which enables short-time cleaning using an alkali liquid of a lower pH value. In the course of searching and examination, the inventors found that partial substitution of hydrogen atoms in a free carboxyl group(s) introduced to a molecule of a film-forming resin by alkali metal is effective for dissolution of a resin film within 1 minute by an alkali liquid of pH 9.0. The substitution ratio of hydrogen atoms by the alkali metal is preferably adjusted to 1–50% on the basis of all the free carboxyl groups. If the substitution ratio is less than 1%, a time for dissolution of a resin film is not so shortened compared with a resin film having segregation hydroxyl groups unsubstituted by alkali metal, and the resin film is not completely dissolved within 1 minute by an alkali liquid of pH 9.0. If the substitution ratio exceeds 50%, on the contrary, a resulting resin film is excessively hygroscopic so that the resin film is likely to be blocked when an Al-coated steel sheet to which the resin film is applied is stored in a coiled state.

A resin having hydrogen atoms of a free carboxyl group (s) partially substituted by alkali metal is prepared from a resin to which a free carboxyl group(s) is introduced to adjust its acid value at 40–90. If the acid value is less than 40, dissolution of the resin film in an alkali liquid of pH 9.0 is not completed within 1 minute, regardless of substitution of hydrogen atoms by alkali metal. If the acid value exceeds 90, on the contrary, the anti-scratching property of the resin film is poor.

An alkali-soluble resin is preferably a urethane or acrylic resin excellent in adhesiveness and plasticity, wherein a free carboxyl group(s) is introduced to adjust an acid value at 40–90, and hydrogen atoms of the free carboxyl group(s) are partially substituted by alkali metal. The acrylic resin has the advantage that the free carboxyl group(s) is easily introduced, since raw material with the carboxyl group can be used for synthesis. Introduction of the free carboxyl group(s) to a urethane resin synthesized from raw materials free from carboxyl groups is performed by reaction of a hydrophilic chemical compound having a carboxyl group with diisocyanate.

There are no special restrictions on synthesis of a urethane or acrylic resin. Any conventional process may be adopted, so long as the effects of the present invention are not hurt. However, even though a resin form is not restricted, a desirable resin is soluble in an organic solvent or water or dispersible in water. The water-soluble or water-dispersible resin is especially desirable in the viewpoint of coating operation. A film-forming auxiliary such as an alkylene glycol derivative, dialkyl ester of an aliphatic dicarboxylic acid or N-methyl-2-pyrrolidone may be added to the resin.

The resin film is preferable of 0.2–5 μm in thickness. If the resin film is thinner than 0.2 μm, its anti-scratching property is poor. However, the resin film thicker than 5 μm necessitates a longer time for dissolution in an alkali cleaning step.

A powdery synthetic resin incompatible with the alkali-soluble resin may be added to the resin composition for formation of the resin film, in such a manner that the powdery synthetic resin is partially projected from a surface of the resin film. Dispersion of such powdery synthetic resin improves workability of the Al-coated steel sheet, so that the Al-coated steel sheet can be press-worked without application of a lubricant oil even to a part which is subjected to severe reformation. The effect of the powdery synthetic resin on workability is realized by addition at a ratio of 1 mass % or more on the basis of the resin composition. However, excessive addition of the powdery synthetic resin more than 25 mass % destabilizes suspension of the powdery synthetic resin in a treating liquid, and causes gelation of the powdery synthetic resin. In this consequence, a ratio of the powdery synthetic resin added to the resin composition is determined within a range of 1–25 mass % (preferably 3–20 mass %).

Any of a fluororesin, a polyolefinic resin such as polyethylene or polypropylene, a styrenic resin such as ABS or polystyrene, and a halogenized resin such as vinyl chloride or polyvinylidene chloride may be used as such powdery synthetic resin. One or more of these powdery synthetic resins may be added to the resin composition. The powdery synthetic resin may be provided by mechanical crushing to a proper particle size or offered as a liquid suspension prepared by chemically or mechanically dispersing the synthetic resin in a proper solvent.

Addition of powdery silica to the resin composition improves heat resistance and anti-scratching property of the resin film, so that the Al-coated steel sheet can be press-worked even at a temperature of a metal die near 200° C. without damages on the resin film. The effect of the powdery silica on the anti-scratching property is realized by addition at a ratio of 1 mass % on the basis of the resin composition. However, excessive addition of silica more than 30 mass % deteriorates stability of a treating liquid. The powdery silica may be added together with the powdery synthetic resin to the resin composition.

An Al-coated steel sheet as a substrate for formation of the resin film may be a steel sheet coated with pure Al or an Al alloy such as Al-Si (containing 3–13 mass % Si), Al—Zn, Al—Zn—Si, Al—Mg or Al—Mn. These Al-coated steel sheets are manufactured by a hot-dip process, a vacuum deposition process, a molten salt process or the like. A steel sheet coated with pure Al is preferably one manufactured by the vacuum deposition or molten salt process, since a thick Fe—Al interlayer poor of ductility is formed at a boundary between a substrate and a plating layer of a hot-dip coated steel sheet. On the other hand, since a steel sheet coated with an Al alloy can be manufactured at a low cost by the hot-dip process without formation of such a brittle interlayer, advantages of the hot-dip process are utilized.

The Al-coated steel sheet is preferably subjected to chromating treatment, after the resin film is dissolved off by alkali-cleaning. A chromate film formed on a surface of the cleaned steel substrate by the chromating treatment effectively improves corrosion-resistance of the steel substrate. Either one of reactive chromating, spray-type chromating or electrolytic chromating may be adopted for formation of such a chromate film. A phosphoric acid or inorganic sol effective for improvement of corrosion-resistance and paint adhesiveness may be optionally added to a chromating composition. The chromate film is preferably formed at a ratio of 5–100 mg/m² calculated as metallic Cr. Adhesion of the chromate film at a ratio less than 5 mg/m² causes poor corrosion-resistance, but excessive adhesion of the chromate film more than 100 mg/m² abruptly deteriorates weldability.

Although there are not any special restrictions on formation of a resin film, an emulsion is prepared from a liquid resin having a carboxyl group(s) in its molecule to which a powdery synthetic resin and/or powdery silica is optionally added. Such an emulsion is applied to a steel sheet by a proper method selected from brushing, application with rolls or bars, showering, spraying and electrostatic atomization resulting in economical efficiency and productivity, to form a uniform resin film on the Al-coated steel sheet. The applied resin is dried at an ambient temperature or a high temperature.

After formation of the resin film, the Al-coated steel sheet is trimmed to a proper size and press-worked to a shape for upper and lower halves of a fuel tank. The halves are seam-welded or spot-welded together to a unitary body, and an anti-corrosion paint is applied to an external surface of the unitary body. Thus, a fuel tank for an automobile is manufactured. In this manufacturing process, the halves are washed with an alkali liquid to dissolve off the resin film after the press-working step but before the welding step. Some fuel tanks have small sub-tanks and pipings connected thereto, in addition to the halves. The present invention is also applicable to production of such members.

The present invention will be more apparent from the following examples, referring to the drawings. Of course, these examples do not put any restrictions on the scope of the present invention.

EXAMPLE 1

Several kinds of urethane emulsions containing carboxyl groups with various acid values were prepared by mixing 2,2-dimethylol propionic acid, hexamethylene diisosyanate, adipic acid, 1,4-butylene glycol and ethylene glycolic polyester polyol at various ratios. Powdery silica and/or a powdery synthetic resin (a mixture of polyethylene resin with fluororesin) were added to some of the emulsions.

A steel sheet of 0.8 mm in thickness hot-dip coated with an Al-9% Si alloy at a ratio of 30 g/m² per single surface was used as a base sheet for painting. After the Al-coated steel sheet was chromated at a ratio of 20 mg/ml² calculated as Cr, each emulsion was directly applied to the Al-coated steel sheet by a bar-type applicator, dried in an oven so as to form resin films different each other in thickness.

Table 1 shows compositions and thickness of resin films formed on surfaces of the Al-coated steel sheets.

TABLE 1

COMPOSITIONS AND THICKNESS OF RESIN FILMS

| Note | Example No. | An acid value of urethane | A ratio of Silica powder (mass %) | A ratio of synthetic resin powder (mass %) | Thickness (μm) |
|---|---|---|---|---|---|
| Examples of the Present Invention | 1 | 40 | 5 | 10 | 1.0 |
| | 2 | 90 | 10 | 8 | 1.2 |
| | 3 | 75 | 1 | 12 | 0.8 |
| | 4 | 80 | 30 | 10 | 1.5 |
| | 5 | 70 | 15 | 1 | 2.0 |
| | 6 | 73 | 20 | 25 | 0.9 |
| | 7 | 80 | 10 | 8 | 0.2 |
| | 8 | 60 | 10 | 8 | 5.0 |
| | 9 | 70 | — | 10 | 1.2 |
| | 10 | 70 | 12 | — | 1.2 |
| | 11 | 75 | — | — | 1.0 |
| | 12 | 60 | 5 | 10 | 0.1 |
| | 13 | 70 | 5 | 10 | 7.0 |
| | 14 | 120 | 10 | 10 | 1.2 |

TABLE 1-continued

COMPOSITIONS AND THICKNESS OF RESIN FILMS

| Note | Example No. | An acid value of urethane | A ratio of Silica powder (mass %) | A ratio of synthetic resin powder (mass %) | Thickness (μm) |
|---|---|---|---|---|---|
| | 15 | 60 | 40 | 10 | 0.9 |
| | 16 | 60 | 20 | 35 | 0.8 |
| Comparative | 1 | 10 | 10 | 10 | 1.0 |
| Examples | 2 | 20 | 10 | 10 | 1.0 |
| | 3 | without a resin film (as chromated) | | | |

Samples were cut off the Al-coated steel sheets painted with the resin films and subjected to the following tests.

(1) Solubility Test of Resin Film

Each sample was immersed in a NaOH solution of pH 11 at 40° C. until a resin film was dissolved off. Solubility of the resin film was judged by a time period spent for dissolution of the resin film, as follows; dissolution in one minute as ⊚, in 1–2 minutes as ○, in 2–5 minutes as Δ and in longer than 5 minutes as X.

(2) Anti-Scratching Test

A disc-shaped sample of 90 mm in diameter was drawn to a cylindrical form using metal dies held at 20° C. and 100° C. and punches of 40 mm in diameter with a drawing ratio of 2.35 and a wrinkle-pressing force of $1.5 \times 10^4$N. The drawn sample was observed to detect persistence of the resin film at its drawn part. Anti-scratching property of the resin film was judged by a residual ratio of the resin film at the drawn part as follows; a residual ratio of 80% or more as ⊚, 60–80% as ○, 40–60% as Δ and less than 40% as X.

(3) Workability Test

A disc-shaped sample of 94 mm in diameter $L_1$ was drawn to a cylindrical form using a metal die held at 100° C. and a punch of 40 mm in diameter with a drawing ratio of 2.60 and a wrinkle-pressing force of $2.5 \times 10^4$N. An average diameter $L_2$ of the drawn sample was measured, and a ratio of $L_2$ to $L_1$ was calculated. Workability of the sample was judged by the ratio $L_2/L_1$ as follows; a ratio less than 0.80 as ⊚, 0.80–0.86 as ○, 0.86–0.90 as Δ and 0.90 or more as X.

(4) Corrosion Test for Inner Surface

After a sample of 84 mm in diameter was drawn to a cylindrical form with a drawing ratio of 2.1 using a metal die held at 100° C., it was washed 5 minutes by spraying an alkaline liquid of pH 11 at 40° C. The washed sample was immersed in each of test liquids A–C, and left as such 10 weeks in the test liquid which was repeatedly exchanged by new one every week. Dissolution of the resin film was measured after 10 weeks-immersion. Corrosion-resistance of the sample was judged by a dissolution loss as follows; a dissolution loss less than 0.3 g/m² (less than 0.15 g.m² in case of the test liquid C) as ⊚, 0.3–0.5 g/m² (0.15–0.25 g/m² in case of the test liquid C) as ○ and 0.5 g/m² or more (0.25 g/m² or more in case of the test liquid C) as X.

Test Liquid A: a liquid mixture of 50% gasoline with 50% water containing 350 ppm a formic acid Test Liquid B: a liquid mixture of 85% methanol containing 350 ppm a formic acid with 15% gasoline Test Liquid C: a liquid mixture of 50% gasoline with 50% water containing 50 ppm Cl (5) Post-Coat Corrosion Test After a sample was drawn to a cylindrical form by the same way as (4), a black aminoalkyd resin was sprayed to the sample to form a resin film of 20 μm in thickness. The painted sample was examined by a salt water spraying test regulated in JIS Z2371, and a ratio of rust formation was measured after 1000 hours-spraying. Post-coat corrosion-resistance of the sample was judged by the ratio of rust formation as follows; a ratio of 0% as ⊚, less than 10% as ○, 10–50% as Δ and 50% or more as X.

Table 2 shows the test results.

TABLE 2

PROPERTIES OF Al-COATED STEEL SHEET PAINTED WITH RESIN FILMS

| Note | Example No. | Solubility of a resin film | Anti-Scratching Property Temp. (° C.) of a Metal Die 20 | Anti-Scratching Property Temp. (° C.) of a Metal Die 100 | Workability | Corrosion-resistance At Inner Surface Test Liquid A | Corrosion-resistance At Inner Surface Test Liquid B | Corrosion-resistance At Inner Surface Test Liquid C | Post-Coat Corrosion Resistance |
|---|---|---|---|---|---|---|---|---|---|
| Examples of the Present Invention | 1 | ○ | ⊚ | ⊚ | ⊚ | ⊚ | ⊚ | ⊚ | ⊚ |
| | 2 | ⊚ | ⊚ | ⊚ | ⊚ | ⊚ | ⊚ | ⊚ | ⊚ |
| | 3 | ⊚ | ⊚ | ⊚ | ⊚ | ⊚ | ⊚ | ⊚ | ⊚ |
| | 4 | ⊚ | ⊚ | ⊚ | ○ | ⊚ | ⊚ | ⊚ | ⊚ |
| | 5 | ⊚ | ⊚ | ⊚ | ○ | ⊚ | ⊚ | ⊚ | ⊚ |
| | 6 | ⊚ | ⊚ | ⊚ | ○ | ⊚ | ⊚ | ⊚ | ⊚ |
| | 7 | ⊚ | ⊚ | ⊚ | ⊚ | ⊚ | ⊚ | ⊚ | ⊚ |
| | 8 | ○ | ⊚ | ⊚ | ⊚ | ⊚ | ⊚ | ⊚ | ⊚ |
| | 9 | ⊚ | ⊚ | Δ | ⊚ | ○ | ○ | ○ | ○ |
| | 10 | ⊚ | ○ | ○ | Δ | ○ | ○ | ○ | ○ |
| | 11 | ⊚ | Δ | Δ | Δ | Δ | Δ | Δ | Δ |
| | 12 | ⊚ | ○ | Δ | Δ | ○ | ○ | ○ | ○ |
| | 13 | Δ | ⊚ | ⊚ | ⊚ | ⊚ | ⊚ | ⊚ | ○ |
| | 14 | ⊚ | ○ | Δ | Δ | Δ | Δ | Δ | ○ |
| | 15 | ⊚ | Δ | Δ | Δ | Δ | Δ | Δ | Δ |
| | 16 | ⊚ | Δ | Δ | Δ | Δ | Δ | Δ | Δ |
| Comparative Examples | 1 | x | ⊚ | ⊚ | ⊚ | ⊚ | ⊚ | ⊚ | Δ |
| | 2 | x | ⊚ | ⊚ | ⊚ | ⊚ | ⊚ | ⊚ | Δ |
| | 3 | — | x | x | x | x | x | x | x |

EXAMPLE 2

Several acrylic resin emulsions with different acid values were prepared by reacting methyl methacrylate, buthyl acrylate, methacrylic acid and acrylic acid together at various ratios. Powdery silica and/or powdery synthetic resins (a mixture of polyethylene resin with fluororesin) were added to some of the emulsions.

A steel sheet of 0.9 mm in thickness hot-dip coated with an Al-9% Si alloy at a ratio of 40 g/m² per single surface was used as a base sheet for painting. After the Al-coated steel sheet was chromated at a ratio of 16 mg/m² calculated as Cr, each emulsion was applied to it by a bar-type applicator and then dried in an oven to form resin films different in thickness.

Table 3 shows compositions and thickness of resin films formed on the Al-coated steel sheets, while Table 4 shows properties of the resin films measured by the same way as Example 1.

EXAMPLE 3

Several emulsions of carboxylic group-containing urethane resins with different acid values were prepared. After NaOH or KOH was added to each emulsion, powdery silica and/or a powdery synthetic resin (a mixture of polyethylene resin with fluororesin) was added to the emulsion. The emulsion was applied to an Al-coated steel sheet by the same way as Example 1. Compositions and thickness of resin films formed on the Al-coated steel sheets are shown in Table 5.

TABLE 3

COMPOSITIONS AND THICKNESS OF RESIN FILMS

| Note | Example No. | An acid Value of Acrylic Resin | A Ratio of Powdery Silica (mass %) | A ratio of Powdery Synthetic resin (mass %) | Thickness (μm) |
|---|---|---|---|---|---|
| Examples of the Present Invention | 21 | 40 | 20 | 10 | 0.8 |
| | 22 | 90 | 15 | 8 | 1.2 |
| | 23 | 70 | 1 | 15 | 1.0 |
| | 24 | 70 | 10 | 1 | 1.0 |
| | 25 | 75 | 30 | 10 | 2.0 |
| | 26 | 80 | 10 | 25 | 1.5 |
| | 27 | 60 | 10 | 10 | 0.2 |
| | 28 | 85 | 20 | 9 | 5.0 |
| | 29 | 70 | — | 10 | 1.0 |
| | 30 | 75 | 20 | — | 1.0 |
| | 31 | 75 | — | — | 1.0 |
| | 32 | 80 | 10 | 10 | 0.1 |
| | 33 | 80 | 10 | 10 | 8.0 |
| | 34 | 130 | 10 | 10 | 1.0 |
| | 35 | 70 | 50 | 10 | 1.0 |
| | 36 | 78 | 15 | 40 | 1.0 |
| Comparative Examples | 11 | 10 | 10 | 10 | 1.2 |

TABLE 5

COMPOSITIONS AND THICKNESS OF RESIN FILMS

| | | Urethane Resin | | A Ratio of Powdery Silica (mass %) | A Ratio of Powdery Synthetic Resin (mass %) | Thickness (μm) |
|---|---|---|---|---|---|---|
| Example No. | An Acid Value | Metal Substituted for Carboxyl Group Kind | Substitution Ratio (%) | | | |
| 41 | 40 | Na | 40 | 10 | 10 | 0.2 |
| 42 | 52 | Na | 30 | 1 | 8 | 2.0 |
| 43 | 61 | Na | 28 | 20 | 1 | 2.5 |
| 44 | 65 | K | 50 | 5 | 20 | 1.5 |
| 45 | 68 | K | 30 | 15 | 7 | 1.0 |
| 46 | 68 | K | 27 | 10 | 15 | 2.5 |
| 47 | 72 | K | 24 | — | — | 3.0 |
| 48 | 70 | K | 28 | 10 | 5 | 0.5 |
| 49 | 70 | Na | 18 | 15 | 3 | 1.0 |
| 50 | 76 | K | 20 | 30 | 10 | 2.0 |
| 51 | 76 | Na | 1 | 5 | 7 | 0.8 |
| 52 | 72 | Na | 10 | — | 20 | 1.2 |
| 53 | 72 | Na | 10 | 12 | — | 2.0 |
| 54 | 80 | K | 15 | 8 | 25 | 1.5 |
| 55 | 90 | K | 10 | 30 | 10 | 5.0 |
| 56 | 90 | K | 3 | 25 | 5 | 4.0 |
| 57 | 90 | Na | 0.1 | 15 | 3 | 2.5 |
| 58 | 20 | K | 50 | 10 | 5 | 2.0 |

TABLE 4

PROPERTIES OF AL-COATED STEEL SHEET PAINTED WITH RESIN FILMS

| NOTE | Example No | Solubility of A Resin Film | Anti-Scratching Property Temp. (° C.) of a Metal Die | | Workability | Corrosion-resistance at an Inner Surface Test Liquid | | | Post-Coat Corrosion-resistance |
|---|---|---|---|---|---|---|---|---|---|
| | | | 20 | 100 | | A | B | C | |
| Examples of the Present Invention | 21 | ○ | ⊚ | ⊚ | ⊚ | ⊚ | ⊚ | ⊚ | ⊚ |
| | 22 | ⊚ | ⊚ | ⊚ | ⊚ | ⊚ | ⊚ | ⊚ | ⊚ |
| | 23 | ⊚ | ⊚ | ⊚ | ⊚ | ⊚ | ⊚ | ⊚ | ⊚ |
| | 24 | ⊚ | ⊚ | ⊚ | ○ | ⊚ | ⊚ | ⊚ | ⊚ |
| | 25 | ⊚ | ⊚ | ⊚ | ⊚ | ⊚ | ⊚ | ⊚ | ⊚ |
| | 26 | ⊚ | ⊚ | ⊚ | ⊚ | ⊚ | ⊚ | ⊚ | ⊚ |
| | 27 | ⊚ | ⊚ | ⊚ | ⊚ | ⊚ | ⊚ | ⊚ | ⊚ |
| | 28 | ⊚ | ⊚ | ⊚ | ⊚ | ⊚ | ⊚ | ⊚ | ⊚ |
| | 29 | ⊚ | ⊚ | Δ | ⊚ | ○ | ○ | ○ | ○ |
| | 30 | ⊚ | ○ | ○ | Δ | ○ | ○ | ○ | ○ |
| | 31 | ⊚ | Δ | Δ | Δ | Δ | Δ | Δ | Δ |
| | 32 | ⊚ | Δ | Δ | Δ | Δ | Δ | Δ | Δ |
| | 33 | Δ | ⊚ | ⊚ | ⊚ | ⊚ | ⊚ | ⊚ | ⊚ |
| | 34 | ⊚ | Δ | Δ | Δ | Δ | Δ | Δ | ○ |
| | 35 | ⊚ | Δ | Δ | Δ | Δ | Δ | Δ | Δ |
| | 36 | — | — | — | — | — | — | — | — |
| Comparative Example | 11 | x | ⊚ | ⊚ | ⊚ | ⊚ | ⊚ | ⊚ | Δ |

An emulsion of Example No. 36 was not used for application due to gelation.

TABLE 5-continued

COMPOSITIONS AND THICKNESS OF RESIN FILMS

| | | Urethane Resin | | A Ratio of | | |
|---|---|---|---|---|---|---|
| Example No. | An Acid Value | Metal Substituted for Carboxyl Group Kind | A Ratio of Substitution Ratio (%) | Powdery Silica (mass %) | Powdery Synthetic Resin (mass %) | Thickness (μm) |
| 59 | 75 | K | 70 | 15 | 5 | 1.0 |
| 60 | 50 | — | — | 10 | 5 | 1.0 |

A sample was cut off each Al-coated steel sheet painted with the resin film and examined by the following tests.

(6) Stability Test of an Emulsion

An emulsion was received in a hermetically sealed glass vessel and left as such at 40° C. Stability of the emulsion was judged by days until occurrence of thickening or gelation as follows; no detection of thickening or gelation over 20 days as ⊚, over 10 days as ○ and occurrence of thickening or gelation in 10 day holding as X.

(7) Solubility Test B of A Resin Film

Each sample was immersed in a few kinds of NaOH solution of different pH values at 40° C., and a time period until dissolution of a resin film was counted. Stability of a resin film was judged by a time period for dissolution of the resin film as follows; dissolution in 0.5 minutes or shorter as ⊚, 0.5–1 minute as ○, 1–3 minutes as △ and longer than 3 minutes as X.

(8) Blocking Test

Samples were piled up in the state that resin films were held in contact together and left as such 24 hours at 40° C. in an atmosphere of 90% RH with a pressure of 1200 N/cm². Anti-blocking property was judged by separability of the samples as follows; spontaneous separation of the samples as ⊚, forcible separation of the samples without damage of resin films as ○, forcible separation of the samples with partial peeling of resin films as △ and occurrence of peeling over all the resin films due to blocking as X.

(9) Anti-Scratching Test

Anti-scratching property of a resin film was judged by the same anti-scratching test as Example 1.

(10) Corrosion Test for an Inner Surface

Corrosion-resistance of a sample at its inner surface was judged by the same corrosion test as Example 1 except spraying an alkali liquid of pH 10 at 40° C. for 1 minute.

(11) Post-Coat Corrosion Test

Post-coat corrosion-resistance of a sample was judged by the same post-coat corrosion test as Example 1.

Table 6 shows test results.

TABLE 6

PROPERTIES OF AL-COATED STEEL SHEETS PAINTED WITH RESIN FILMS

| Example No. | Stability of an Emulsion | Solubility of A Resin Film a pH value of a NaOH Solution | | | Anti-Blocking Property | Anti-Scratching Property Temp. (° C.) of A Metal Die | | Corrosion-Resistance at an Inner Surface Test Liquid | | | Post-Coat Corrosion-Resistance |
|---|---|---|---|---|---|---|---|---|---|---|---|
| | | 9 | 10 | 11 | | 20 | 100 | A | B | C | |
| 41 | ⊚ | ○ | ○ | ⊚ | ○ | ⊚ | ⊚ | ⊚ | ⊚ | ⊚ | ⊚ |
| 42 | ⊚ | ○ | ○ | ⊚ | ⊚ | ⊚ | ⊚ | ⊚ | ⊚ | ⊚ | ⊚ |
| 43 | ○ | ⊚ | ⊚ | ⊚ | ⊚ | ⊚ | ⊚ | ⊚ | ⊚ | ⊚ | ⊚ |
| 44 | ○ | ⊚ | ⊚ | ⊚ | ○ | ⊚ | ⊚ | ⊚ | ⊚ | ⊚ | ⊚ |
| 45 | ○ | ⊚ | ⊚ | ⊚ | ⊚ | ⊚ | ⊚ | ⊚ | ⊚ | ⊚ | ⊚ |
| 46 | ○ | ⊚ | ⊚ | ⊚ | ⊚ | ⊚ | ⊚ | ⊚ | ⊚ | ⊚ | ⊚ |
| 47 | ⊚ | ⊚ | ⊚ | ⊚ | ⊚ | △ | △ | △ | △ | △ | △ |
| 48 | ⊚ | ⊚ | ⊚ | ⊚ | ⊚ | ⊚ | ⊚ | ⊚ | ⊚ | ⊚ | ⊚ |
| 49 | ○ | ⊚ | ⊚ | ⊚ | ⊚ | ⊚ | ⊚ | ⊚ | ⊚ | ⊚ | ⊚ |
| 50 | ○ | ⊚ | ⊚ | ⊚ | ⊚ | ⊚ | ⊚ | ⊚ | ⊚ | ⊚ | ⊚ |
| 51 | ⊚ | ○ | ○ | ⊚ | ⊚ | ⊚ | ⊚ | ⊚ | ⊚ | ⊚ | ⊚ |
| 52 | ○ | ⊚ | ⊚ | ⊚ | ⊚ | ⊚ | △ | ○ | ○ | ○ | ○ |
| 53 | ○ | ⊚ | ⊚ | ⊚ | ⊚ | △ | △ | △ | △ | △ | △ |
| 54 | ○ | ⊚ | ⊚ | ⊚ | ⊚ | ⊚ | ⊚ | ⊚ | ⊚ | ⊚ | ⊚ |
| 55 | ○ | ○ | ○ | ⊚ | ⊚ | ⊚ | ⊚ | ⊚ | ⊚ | ⊚ | ⊚ |
| 56 | ○ | ⊚ | ⊚ | ⊚ | ⊚ | △ | △ | △ | △ | △ | △ |
| 57 | ⊚ | X | X | △ | ⊚ | ⊚ | ⊚ | ⊚ | ⊚ | ⊚ | ⊚ |
| 58 | ⊚ | X | X | X | ○ | ⊚ | ⊚ | ⊚ | ⊚ | ⊚ | ⊚ |
| 59 | ⊚ | ⊚ | ⊚ | ⊚ | X | ⊚ | ⊚ | ⊚ | ⊚ | ⊚ | ⊚ |
| 60 | ⊚ | X | X | △ | ○ | ⊚ | ⊚ | ⊚ | ⊚ | ⊚ | ⊚ |

EXAMPLE 4

NaOH or KOH was added to emulsions (prepared in Example 2) of acrylic resins having carboxyl groups in its molecule with different acid values. Powdery silica and/or a powdery synthetic resin (a mixture of polyethylene resin with fluororesin) were added to some of the emulsions.

A steel sheet of 0.9 mm in thickness hot-dip coated with an Al-9% Si alloy at a ratio of 30 g/m² per single surface was used as a base sheet for painting. After the Al-coated steel sheet was chromated with a ratio of 15 mg/m² calculated as Cr, each emulsion was applied to the Al-coated steel sheet by a bar-type applicator and dried in an oven to form resin films different in thickness on the Al-coated steel sheets.

Table 7 shows compositions and thickness of the resin films formed on the Al-coated steel sheets, while Table 8 shows properties of the painted steel sheets.

TABLE 7

COMPOSITION AND THICKNESS OF RESIN FILM

| | | Acrylic Resin | | A Ratio of | |
|---|---|---|---|---|---|
| Example No. | An Acid Value | Metal Substituted for Carboxyl Group Kind | A Ratio of Substitution Ratio (%) | Powdery Silica (mass %) | Powdery Synthetic Resin (mass %) | Thickness (μm) |
| 61 | 40 | Na | 50 | 1 | 10 | 0.5 |
| 62 | 50 | Na | 40 | 10 | 5 | 0.2 |
| 63 | 60 | K | 30 | — | — | 0.2 |
| 64 | 62 | K | 33 | 7 | 15 | 2.5 |
| 65 | 68 | K | 30 | 15 | 8 | 1.0 |
| 66 | 70 | K | 18 | 10 | 10 | 2.5 |
| 67 | 72 | K | 24 | — | 1 | 0.6 |
| 68 | 70 | K | 28 | 15 | 5 | 0.5 |
| 69 | 70 | Na | 26 | 10 | 2 | 1.0 |
| 70 | 74 | Na | 20 | 30 | 10 | 3.0 |
| 71 | 74 | Na | 1 | 8 | — | 0.8 |
| 72 | 72 | Na | 10 | 8 | 20 | 2.2 |
| 73 | 68 | Na | 2 | 10 | 5 | 2.0 |
| 74 | 80 | K | 13 | 8 | 25 | 5.0 |
| 75 | 90 | K | 10 | 30 | 10 | 1.5 |
| 76 | 90 | K | 3 | 15 | 35 | 3.0 |
| 77 | 62 | Na | 0.1 | 10 | 5 | 2.0 |
| 78 | 20 | K | 50 | 10 | 10 | 2.0 |
| 79 | 200 | — | — | — | — | 2.0 |

TABLE 8

PROPERTIES OF AL-COATED STEEL SHEETS PAINTED WITH RESIN FILMS

| Example No. | Stability of An Emulsion | Solubility of a Resin Film A pH value of a NaOH solution | | | Anti-Blocking Property | Anti-Scratching Property Temp. (° C.) of a Metal Die | | Corrosion-resistance at an Inner Surface Test Liquid | | | Post-Coat Corrosion-Resistance |
|---|---|---|---|---|---|---|---|---|---|---|---|
| | | 9 | 10 | 11 | | 20 | 100 | A | B | C | |
| 61 | ◉ | ○ | ○ | ◉ | ○ | ◉ | ◉ | ◉ | ◉ | ◉ | ◉ |
| 62 | ◉ | ○ | ○ | ◉ | ○ | ◉ | ◉ | ◉ | ◉ | ◉ | ◉ |
| 63 | ◉ | ◉ | ◉ | ◉ | ◉ | △ | △ | △ | △ | △ | △ |
| 64 | ○ | ◉ | ◉ | ◉ | ◉ | ◉ | ◉ | ◉ | ◉ | ◉ | ◉ |
| 65 | ○ | ◉ | ◉ | ◉ | ◉ | ◉ | ◉ | ◉ | ◉ | ◉ | ◉ |
| 66 | ◉ | ◉ | ◉ | ◉ | ◉ | ◉ | ◉ | ◉ | ◉ | ◉ | ◉ |
| 67 | ◉ | ◉ | ◉ | ◉ | ◉ | ○ | △ | △ | △ | △ | △ |
| 68 | ○ | ◉ | ◉ | ◉ | ◉ | ◉ | ◉ | ◉ | ◉ | ◉ | ◉ |
| 69 | ◉ | ◉ | ◉ | ◉ | ◉ | ◉ | ◉ | ◉ | ◉ | ◉ | ◉ |
| 70 | ○ | ◉ | ◉ | ◉ | ◉ | ◉ | ◉ | ◉ | ◉ | ◉ | ◉ |
| 71 | ◉ | ○ | ○ | ◉ | ◉ | △ | △ | △ | △ | △ | △ |
| 72 | ○ | ◉ | ◉ | ◉ | ◉ | ◉ | ◉ | ◉ | ◉ | ◉ | ◉ |
| 73 | ◉ | ◉ | ◉ | ◉ | ◉ | ◉ | ◉ | ◉ | ◉ | ◉ | ◉ |
| 74 | ○ | ○ | ○ | ◉ | ◉ | ◉ | ◉ | ◉ | ◉ | ◉ | ◉ |
| 75 | ○ | ◉ | ◉ | ◉ | — | ◉ | ◉ | ◉ | ◉ | ◉ | ◉ |
| 76 | × | — | — | — | — | — | — | — | — | — | — |
| 77 | ◉ | × | × | △ | ◉ | ◉ | ◉ | ◉ | ◉ | ◉ | ◉ |
| 78 | ◉ | × | × | × | ○ | ◉ | ◉ | ◉ | ◉ | ◉ | ◉ |
| 79 | ○ | × | △ | ○ | × | × | × | × | × | × | △ |

An emulsion of Example No. 76 was not uniformly applied to a steel sheet due to gelation.

EXAMPLE 5

Al-coated steel sheets painted with various resin films by Examples 1–4 were drawn and pressed to shapes of upper and lower halves for a fuel tank of an automobile. Scratches were not detected on the Al plating layers after being press-worked. After a plurality of openings for connection of various pipes were formed in the upper and lower halves, pipes were spot- or projection-welded to the upper and lower halves without peeling of resin films.

An alkali liquid of pH 10.5 at 40° C. was sprayed to the upper and lower halves to which pipes were welded. After the upper and lower halves were washed with pure water, their surfaces were observed by FT-IR analysis. It was recognized that resin films were completely dissolved off.

Thereafter, the upper half was laid on the lower half in the manner such that a flange of the upper half was held in face-to-face contact with a flange of the lower half. The flanges were seam-welded together. Any smoke or offensive odor was not discharged during welding. The welded fuel tank was coated with a black paint at its whole external surface. After degraded gasoline was poured in the fuel-tank, the fuel tank was left as such 1 month. Thereafter, the inner and external surfaces of the fuel tank were observed, and it was recognized that the fuel tank was held in a state free from corrosion.

An Al-coated steel sheet for a fuel tank according to the present invention as above-mentioned has a resin film formed on its surface for inhibition of scratches during press-working for shaping it to members of a fuel tank. Due to such resin film, the fuel tank is improved in corrosion resistance to stored fuel without exposition of base steel. Since the resin film is composed of an alkali-soluble resin, it is easily washed off by an alkali liquid after the Al-coated steel sheet has been shaped to members of the fuel tank. As a result, the Al-coated steel sheet can be welded without generation of smoke or offensive odor caused by thermal decomposition of the resin film with a weld heat.

Dissolution of the resin film is facilitated by proper selection of a resin which is soluble in an alkali liquid of pH 9.0 or higher. A resin having a carboxylic group(s) in its molecule to adjust its acid value within a range of 40–90 is preferable for formation of a resin film excellent in solubility and film formability. Especially, a resin, in which 1–50% hydrogen atom of the introduced carboxyl group(s) is substituted by alkali metal, is formed to a resin film which can be dissolved off in one minute by an alkali liquid of pH 9.0. A time necessary for dissolution is well balanced with anti-scratching property by adjusting thickness of the resin film to 0.2–5.0 μm.

The resin film, which serves as a protective layer for the Al-coated steel sheet until press-working, is easily removed from the Al-coated steel sheet by alkali-washing before resistance-welding. Therefore, a powdery synthetic resin or silica may be dispersed in the resin film for improvement of anti-scratching property without harmful influences on an anti-corrosion paint layer to be formed on a surface of a fuel tank. In addition, alkali-washing is performed between a press-working step and a welding step in a fuel tank manufacturing line, so that a fuel tank is manufactured by the same line as a conventional one without increase of cost due to an additional step.

What is claimed is:

1. A fuel tank having improved durability and corrosion-resistance properties made from an Al coated steel sheet having an alkali-soluble resin film directly formed on a surface of said Al-coated steel sheet wherein the alkali-soluble resin film is a protective film for providing at least anti-scratching properties, and is removable from the surface of said Al-coated steel sheet after press-forming to a final shape, the resin film is having an acid value of 40–90 and containing carboxyl groups, wherein 1–50% hydrogen atoms in the carboxyl groups being substituted with alkali metal, and the resin film being soluble in an alkali liquid of pH 9.0 or higher.

2. The fuel tank made from an Al coated steel sheet defined in claim 1, wherein the alkali-soluble resin is urethane.

3. The fuel tank made from an Al coated steel sheet defined in claim 1, wherein the resin film is mixed with 1–25 mass % a powdery synthetic resin.

4. The fuel tank made from an Al coated steel sheet defined in claim 1, wherein the resin film has a thickness of 0.2–5.0 $\mu$m formed on the fuel tank made from an Al coated steel sheet.

5. The fuel tank made from an Al coated steel sheet defined in claim 1, wherein the alkali-soluble resin is acrylic resin.

6. The fuel tank made from an Al coated steel sheet defined in claim 1, wherein the resin film is mixed with 1–30 mass % powdery silica.

* * * * *

UNITED STATES PATENT AND TRADEMARK OFFICE
CERTIFICATE OF CORRECTION

PATENT NO. : 6,905,041 B1
DATED : June 14, 2005
INVENTOR(S) : Taketsu et al.

It is certified that error appears in the above-identified patent and that said Letters Patent is hereby corrected as shown below:

Title page,
Item [56], References Cited, FOREIGN PATENT DOCUMENTS,
"JP     10272582     10/1997" should read
-- JP     10272582     10/1998 --.

Column 15,
Line 19, "the resin film is having" should read -- the resin film having --.

Signed and Sealed this

Tenth Day of January, 2006

JON W. DUDAS
*Director of the United States Patent and Trademark Office*

UNITED STATES PATENT AND TRADEMARK OFFICE
CERTIFICATE OF CORRECTION

PATENT NO. : 6,905,041 B1
APPLICATION NO. : 09/787998
DATED : June 14, 2005
INVENTOR(S) : Taketsu et al.

Page 1 of 1

It is certified that error appears in the above-identified patent and that said Letters Patent is hereby corrected as shown below:

Title Page Item (73) Assignee: after "Nisshin Steel Co., Ltd., Tokyo (JP)", add -- Toyota Jidosha Kabushiki Kaisha, Tokyo (JP) --

Title Page Item (56) References Cited, FOREIGN PATENT DOCUMENTS, the sixth reference in Column 2, "JP     10272582     10/1997" should read -- JP     10272582     10/1998 --

Column 15, Line 19, Claim 1, "the resin film is having" should read -- the resin film having --

Signed and Sealed this

Twenty-sixth Day of February, 2008

JON W. DUDAS
*Director of the United States Patent and Trademark Office*